US010282689B1

United States Patent
Johnston et al.

(10) Patent No.: US 10,282,689 B1
(45) Date of Patent: May 7, 2019

(54) EVENT-BASED COMPOSITION MODEL FOR WORKFLOW SYSTEMS

(75) Inventors: Simon K. Johnston, Snohomish, WA (US); Ramanathan Palaniappan, Seattle, WA (US); Alan M. Steele, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2011 days.

(21) Appl. No.: 13/408,968

(22) Filed: Feb. 29, 2012

(51) Int. Cl.
*G06Q 10/06* (2012.01)
*G06Q 10/10* (2012.01)

(52) U.S. Cl.
CPC ....... *G06Q 10/0633* (2013.01); *G06Q 10/103* (2013.01); *G06Q 10/063114* (2013.01)

(58) Field of Classification Search
CPC .............................. G06Q 10/00; G06Q 30/02
USPC ................................................. 705/7.11–7.42
See application file for complete search history.

(56) References Cited

U.S. PATENT DOCUMENTS

| | | | | |
|---|---|---|---|---|
| 7,065,493 | B1 * | 6/2006 | Homsi | 705/7.26 |
| 7,835,933 | B2 * | 11/2010 | Casati et al. | 705/7.12 |
| 8,463,633 | B2 * | 6/2013 | Jung et al. | 705/7.11 |
| 8,700,414 | B2 * | 4/2014 | Rothermel et al. | 705/1.1 |
| 2005/0209904 | A1 * | 9/2005 | Hayashi | 705/9 |
| 2009/0006172 | A1 * | 1/2009 | Singh et al. | 705/9 |
| 2009/0037240 | A1 * | 2/2009 | Schmidt et al. | 705/7 |
| 2013/0018703 | A1 * | 1/2013 | Majeed et al. | 705/7.38 |

* cited by examiner

*Primary Examiner* — Robert D Rines
(74) *Attorney, Agent, or Firm* — Seed IP Law Group LLP

(57) ABSTRACT

Techniques are described for providing clients with access to events occurring during execution of defined workflows, such as under the control of a event monitoring service that is available to multiple subscribers, such as over one or more public networks. A configurable workflow service may automatically create events when a defined workflow executes, and, provide the events to the event monitoring service, which may respond to the generated events by taking various actions, such as providing event notifications, initiating workflow instances, etc.

21 Claims, 6 Drawing Sheets

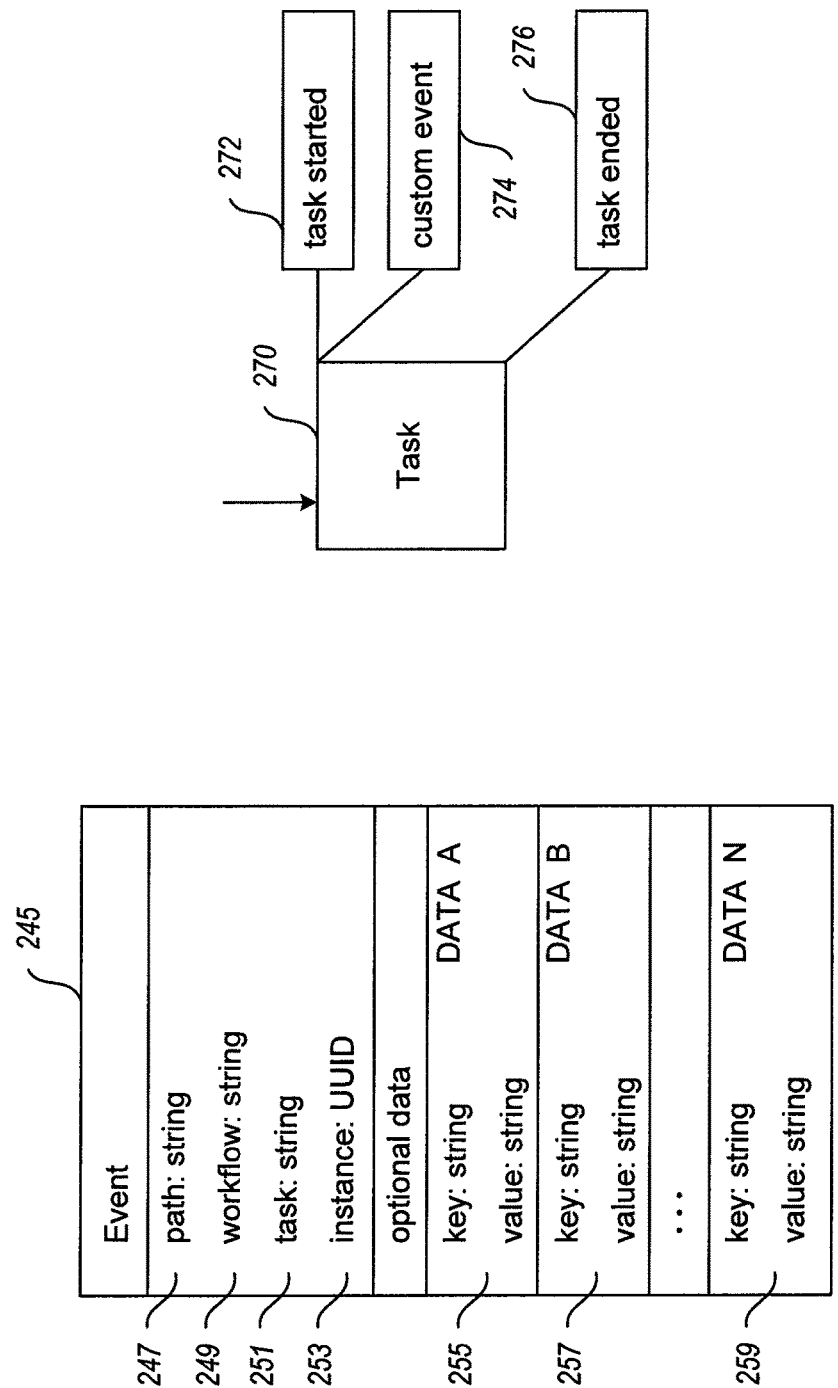

EVENT-BASED COMPOSITION MODEL FOR WORKFLOW SYSTEMS

BACKGROUND

As the amount of data that is generated and used by software programs has grown, the complexity of managing and analyzing such data has also increased in at least some situations. In addition, as software programs increasingly execute in online and other networked environments, the data to manage and analyze is increasingly accessible in disparate locations and manners, which may increase the complexity of managing and analyzing such data. Thus, various problems exist in managing and analyzing data that is generated and used by software programs.

BRIEF DESCRIPTION OF THE DRAWINGS

FIG. 2B illustrates an example data structure of a generated event.

FIG. 2C illustrates an example of generating a custom event associated with a component of a workflow.

DETAILED DESCRIPTION

Figure 1:
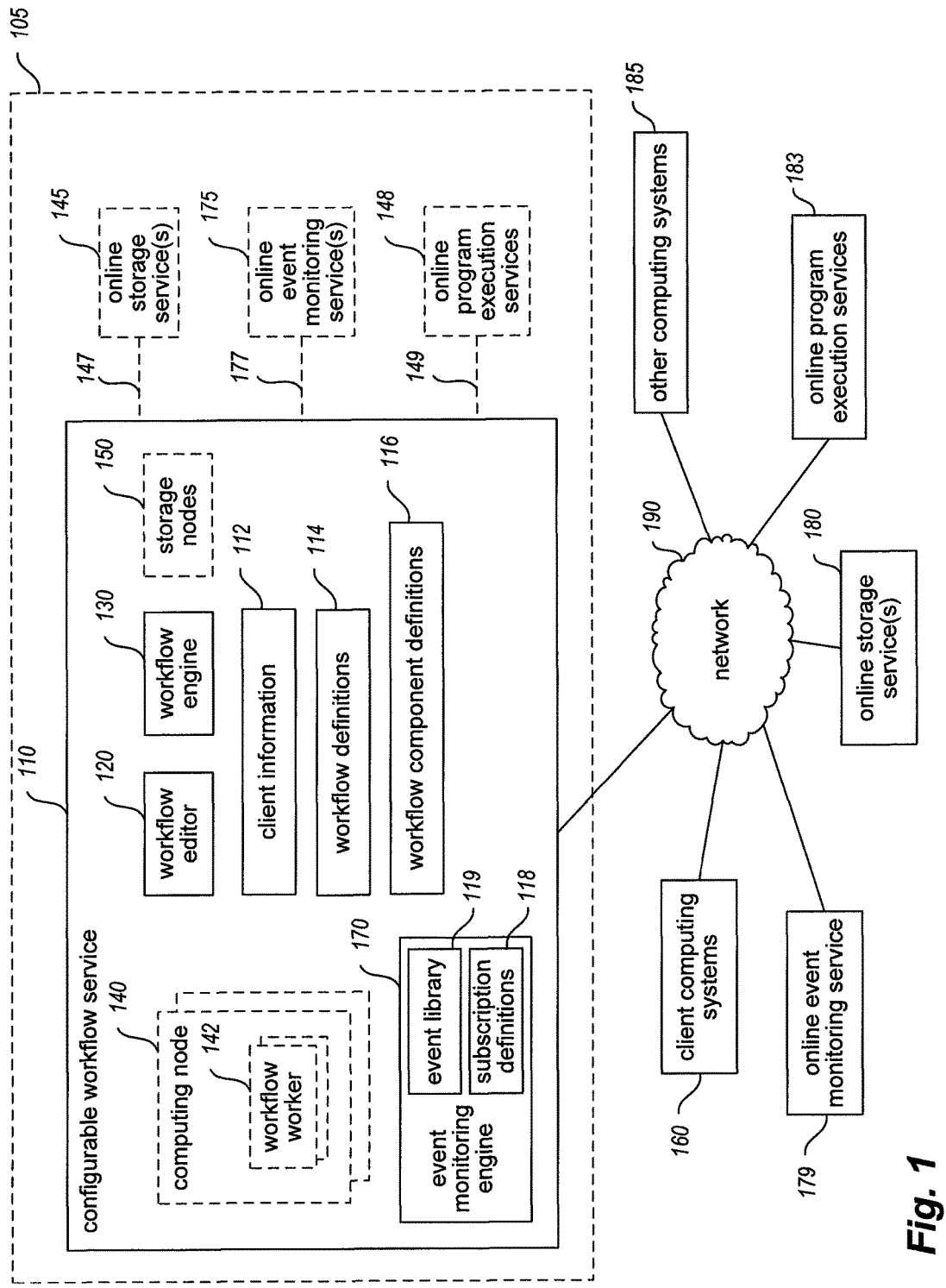
FIG. 1 illustrates an example embodiment of a configurable workflow service that provides functionality to enable remote clients to create, configure and execute defined workflows that manipulate source data in defined manners.

Techniques are described for providing clients with access to functionality for creating, configuring and executing defined workflows that manipulate source data in defined manners, such as under the control of a configurable workflow service that is available to multiple remote clients. In at least some embodiments, a remote client may interact with a configurable workflow service over one or more public networks in order to create and configure a defined workflow that is provided by the configurable workflow service for use by the client—such a defined workflow may, for example, include multiple interconnected workflow components that each are configured to perform one or more specified types of data manipulation operations on a specified type of input data. After a client has configured such a defined workflow, the configurable workflow service may further execute the defined workflow at one or more times and in one or more manners, such as in some situations by provisioning multiple computing nodes provided by the configurable workflow service to each implement at least one of the workflow components for the defined workflow, and by retrieving defined types of source data and providing it to workflow components in defined manners. Thus, in at least some embodiments, some or all of the described techniques are automatically performed by embodiments of a configurable workflow service, such as may be implemented by one or more software modules executing on one or more configured computing systems, as described in greater detail below.

As noted above, a defined workflow may include multiple workflow components, such as workflow tasks, which may be of multiple types in at least some embodiments, including to have one or more data source workflow components that correspond to input data for the defined workflow, one or more data manipulation workflow components that correspond to defined data transformations or other manipulations to be performed on data, and one or more data destination workflow components that correspond to providing output data from the defined workflow. In addition, interconnections may be defined between workflow components that correspond to data flows between workflow components, such that data output from a first component may be supplied as input to a second component, with that relationship being represented as a connection from the first component to the second component. In at least some embodiments and situations, the configurable workflow service may provide a group of predefined workflow components that a client may select and use in a defined workflow of the client, optionally after being configured in one or more manners. Furthermore, in at least some embodiments and situations, the configurable workflow service may enable a client to supply or otherwise define some or all workflow components to be used in a defined workflow of the client.

Each data source workflow component that is defined for a workflow may correspond to obtaining data from an indicated data source, and may include information such as a storage location for the data, and optionally additional access information related to the storage location (e.g., login information associated with the client; a particular search or other information to use to identify data to be used, such as related to metadata and/or data contents; etc.). In some embodiments, the configurable workflow service may provide internal storage locations for use by clients in storing their source data, with a particular data source corresponding to such an internal storage location, while in other embodiments and situations, a particular data source may be external to the configurable workflow service, such as one or more network-accessible storage systems that are provided by or otherwise controlled by the client, one or more online storage services, one or more online data generation services, etc. A non-exclusive list of examples of online storage services that may be used include the following: Amazon Simple Storage Service (S3) that stores object data of various types; Amazon Relational Database Service (RDS) that provides relational database functionality; Amazon SimpleDB that provides functionality to store key-value pairs; Amazon DynamoDB service that provides NoSQL database functionality; Amazon Elastic Block Store (EBS) that provides access to raw block storage devices, including to enable mounting a virtual local block storage device on a target computer system; etc. A non-exclusive list of examples of online data generation services includes an RSS feed, the Amazon Cloudwatch Service that provides monitoring functionality for executing applications and services and generates corresponding information, etc. Data sources may thus be of various forms, such as a relational or other database (e.g., the HBase open-source distributed database, the BigTable distributed database, the MongoDB database system, the Apache Cassandra distributed database management system, etc.), a hash table, a file system, an object store, etc., optionally implemented in a distributed manner, and a non-exclusive list of examples of data groups that may be obtained from a data source includes a file (e.g., a Web server log), a database row or other record, a stored data object, a streamed group of data, etc.

Each data manipulation workflow component that is defined for a workflow may correspond to performing one or more defined data transformations or other manipulations on data that is input to the data manipulation workflow component. In addition, the output from a data manipulation workflow component may be provided to a data destination workflow component to be provided to a client or on behalf of a client, or instead may be intermediate data that is provided to a next data manipulation workflow component, such as via one or more electronic messages, by storing the intermediate data in a storage location accessible to the next data manipulation workflow component (e.g., using one or more storage locations provided by the configurable workflow service), etc. Defined data manipulations may be of various forms, including to perform a defined type of calculation on one or more groups of input data, to aggregate multiple groups of input data in one or more manners, to select a subset of one or more groups of input data, to move data from one storage location to another, etc. A non-exclusive list of example data manipulations includes performing a distributed data copy, performing one or more SQL (Structured Query Language) transforms, performing one or more map and/or reduce functions within a map-reduce architecture (e.g., for use within the Amazon Elastic MapReduce service), using a scientific or mathematics package (e.g., MatLab, Mathematica, etc.), executing a client-supplied script or other program, etc. Thus, in some situations and embodiments, a particular defined workflow may perform multiple data manipulation operations via multiple defined data manipulation workflow components, using pre-defined and/or client-defined data manipulation workflow components.

Each data destination workflow component that is defined for a workflow may correspond to providing output data from the defined workflow to one or more storage locations and/or in one or more manners. The types of storage locations used by data destination workflow components (and corresponding information stored for such data destination workflow components) may be similar to or the same as for data source workflow components in at least some embodiments, including to use storage locations that are internal to and/or external from the configurable workflow service.

Figure 2A:
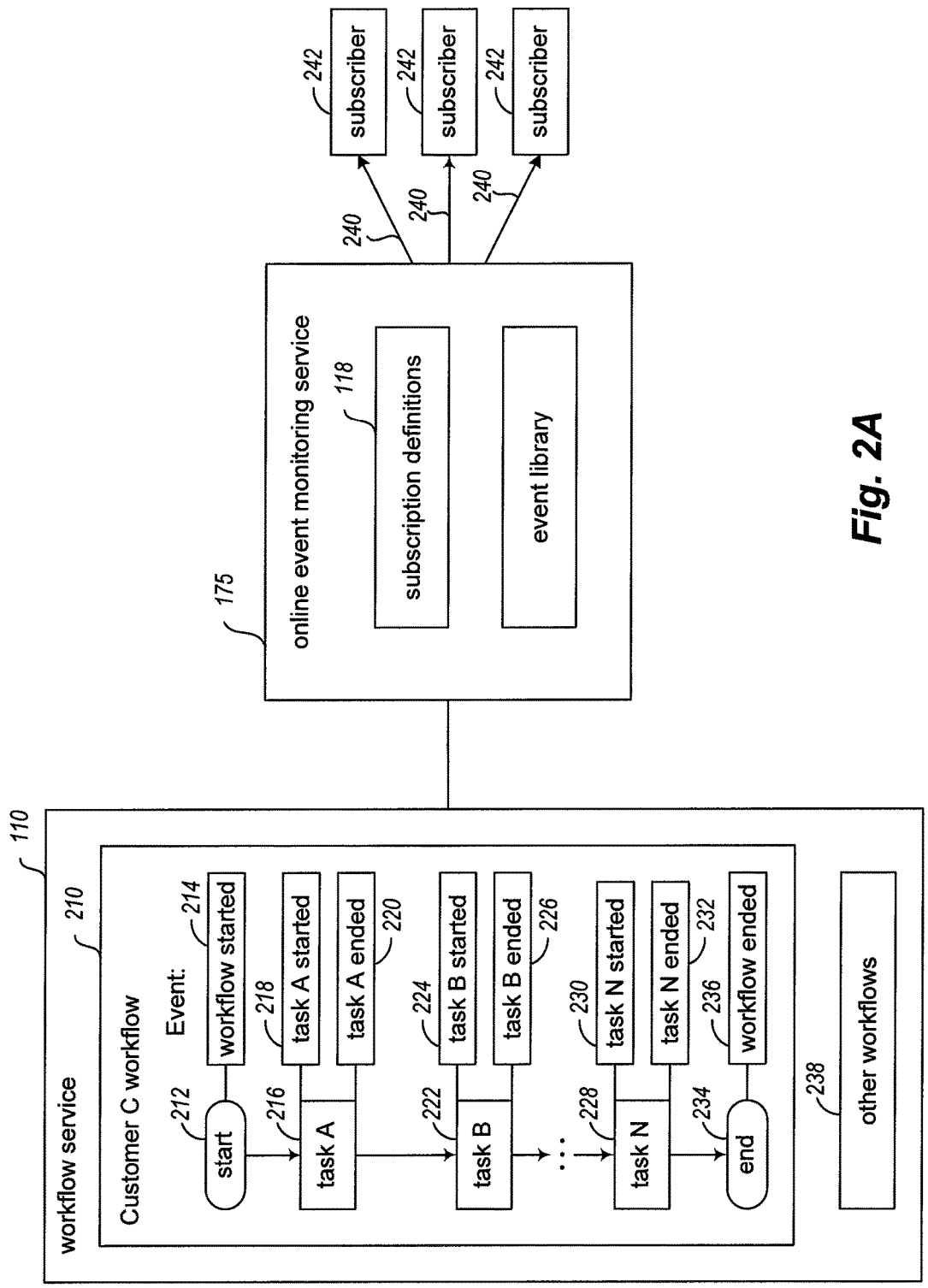
FIG. 2A illustrates an example of generating events during execution of a workflow for a client and of providing notifications to subscribers of the occurrence of the events.

In addition, a client may define a workflow in various manners in various embodiments. For example, an embodiment of a configurable workflow service may provide one or more interfaces for use by a client, such as a defined GUI ("graphical user interface"), a defined API ("application programming interface"), and/or a defined CLI ("command line interface"). When using a provided GUI, a user representative of a client may, for example, use a visual editor to specify particular workflow components for a workflow being defined, and may further specify interconnections between particular workflow components corresponding to data flows—in at least some such embodiments, the configurable workflow service may represent the defined workflow as a graph that logically represents the workflow, with various graph nodes corresponding to particular workflow components. FIG. 2A provides additional illustrative details with respect to an example of such a workflow graph.

The configurable workflow service may further implement a defined workflow for a client in various manners and at various times. In some embodiments, each time that a defined workflow is to be used, the configurable workflow service instantiates a physical copy of the logical graph representing the defined workflow, such as by using multiple computing nodes that each implement at least one workflow component for the defined workflow. In particular, in at least some embodiments, some or all of the computing nodes are provisioned by the configurable workflow service to configure those computing nodes to implement particular workflow components (e.g., to load corresponding software and/or data on those computing nodes), such as to each execute a workload worker process corresponding to each such implemented workflow component. The computing nodes may have various forms in at least some embodiments, including to each be a separate physical computer system, a separate virtual machine (e.g., one of multiple virtual machines hosted on a physical computer system), a group of multiple physical computer systems that are operating in a distributed manner, etc. Some or all such computing nodes used for a defined workflow may in some embodiments be selected from a plurality of computing nodes provided by the configurable workflow service for use by clients. In addition, some or all such computing nodes may be provided by or otherwise controlled by the client and/or may be provided by one or more online execution services, whether instead of or in addition to computing nodes provided by the configurable workflow service. A non-exclusive list of example online execution services that may be used include the Amazon Elastic Compute Cloud ("EC2") program execution service, the Amazon Elastic MapReduce service for performing distributed map-reduce operations (e.g., by using a cluster of computing systems from the service to represent or implement a computing node for the configurable workflow service), etc.

A defined workflow may further have additional types of associated information in at least some embodiments and situations. For example, a client may specify information that indicates when to implement a defined workflow, such as based on a client instruction for immediate implementation, by scheduling future implementation at one or more defined future times, by scheduling one or more future implementations when one or more defined criteria are satisfied (e.g., based at least in part on availability of particular source data), etc. Defined criteria may be specified in various manners, such as to be associated with particular workflow components or instead with the defined workflow as a whole. For example, a particular workflow component may have defined precondition criteria to evaluate to determine when to execute the workflow component, and/or may have defined post condition criteria to evaluate when to complete execution and/or provide data that is produced (e.g., to a next workflow component, to an intermediate storage location, etc.). In some embodiments and situations, a defined workflow may further have one or more associated alarms that may be used to provide notification to a client (or to perform other activities) when one or more specified criteria are satisfied or are not satisfied (e.g., if a defined workflow is not implemented at a particular time, such as if particular source data is not available).

As discussed in more detail elsewhere, a workflow may be described as a directed graph of tasks and transitions between tasks. In at least some embodiments, a workflow instance may be created through an explicit action (e.g., a call to a software API) and the workflow description may used as a template for the tasks to execute in the instance. A workflow may typically be associated with a key-value pair, which may typically be defined in XML or some other data format. For example, the key may be associated with one or more values stored in a data base. Additionally, in at least some embodiments, a system providing a workflow service may define multiple workflows, and may combine workflows, for example to achieve large-grained behaviors, such as to aggregate results of multiple workflows. In at least some embodiments, combining workflows may be accomplished using a controlling workflow instance to create a new instance (e.g., to create a child workflow instance using an API). The controlling workflow knows the identity of all child workflows, and the connections between workflows are embedded in the code of one or more workflow implementation artifacts.

At least some embodiments may employ an event monitoring service to broadcast or publish to one or more event subscribers information pertaining to one or more events associated with one or more workflows, such as information pertaining to tasks and transitions of one or more workflow instances. In some embodiments, a configurable workflow service may provide an event monitoring engine configured to provide event monitoring services, such as broadcasting or publishing to one or more event subscribers information pertaining to one or more events associated with one or more workflows, initiating one or more actions in response receipt of one or more events, etc. In some embodiments, a event monitoring service may be external to configurable workflow service, such as one or more network-accessible systems configured to provide event monitoring services. Event subscribers may respond to a notification from an event monitoring service. For example, an event subscriber may respond to a notification pertaining to an event associated with a workflow instance by modifying a behavior of another workflow instance, by initiating one or more new workflow instances, by terminating an existing instance, by completing an existing task, by assigning/reassigning an existing task, etc. In at least some embodiments, an event monitoring service may take one or more other actions in response to an event associated with one or more workflow instances, such as initiating operations based on the occurrence of one or more events. For example, an event monitoring service may be configured to automatically detect a specific kind of event and to initiate one or more actions in response to receipt of the specific kind of event. For example, an event monitoring service may be configured to respond to receipt of a specific event or type of event by creating a new workflow instance based on that event, by initiating one or more defined workflow instances, by terminating one or more existing instances, by initiating completion of one or more existing tasks, by assigning/reassigning one or more existing tasks, etc. In at least some embodiments, custom events may be defined to publish domain-specific information, facilitating decoupling between producer clients' workflows and consumers of the producer clients, and facilitating coordination between workflows. For example, the defining of custom events may facilitate a producer client's workflow employing a public interface without customers of the producer client needing to know how or where an event is produced. In another example, defining customer events facilitates combining workflows (for example, into a composition of multiple workflows) without a parent workflow needing to know the details of other workflows, and facilitates composition of workflows after the deployment of one or more workflows that generates one or more events. For example, an event monitoring service may notify one or more workflows (such as a child workflow of a parent workflow, etc.) of one or more events of another workflow (such as the parent workflow, another child workflow, etc.), and the notified workflow may respond to the notification by taking one or more defined actions. Thus an event monitoring service may facilitate workflow system supported child workflows listening to a parent workflow, without the parent workflow needing to create and control the child workflows. The child workflows may take various actions in response to receipt of notifications of occurrences of particular events.

In at least some embodiments, one or more transitions in a workflow instance each triggers the creation and publication of an event to the event monitoring service. In at least some embodiments, all transitions of a workflow will trigger the creation and publication of an event to the event monitoring service. An event received by the event monitoring service may be encoded and delivered to one or more subscribers of the event monitoring service. Events may be generated whenever a workflow starts or stops and when entering or leaving any task in the workflow. Additionally, events may be generated if the workflow enters an error state. Each event may be evaluated by the event monitoring service, for example, to determine whether the received event matches a criteria for initiating one or more actions such as notifying a subscriber of the event, initiating one or more other actions, etc. In at least some embodiments, a configurable workflow service may employ a workflow engine to execute workflows and a separate event monitoring engine to provide an event monitoring service to clients of the configurable workflow service. In other embodiments, the event monitoring service may be separate from a workflow service that is executing the workflows. The event monitoring service may be configured to match an event against a list of subscribers, and whenever an event matches a subscription, to deliver an indication of the event to the subscriber. In at least some embodiments, generating of events associated with a workflow may be enabled without any action being taken by the workflow. For example, system-defined events may be generated as described above for workflow start/end/error and task enter/leave transitions, etc.

In at least some embodiments, each event may be represented by a data structure comprising an event path (discussed in more detail elsewhere), a workflow identifier (to identify the type of the workflow itself), a task identifier (which may be empty for workflow start/end/error events) and an instance identifier. Additionally each event may have an associated set of key/value pairs that denote additional data associated with the workflow (e.g., a workflow type, an identification number associated with an item or product associated with the workflow, etc.).

Each event may have an identifier that may be expressed in a defined path-like structure. For example, starting from the left-hand side segments may become more specific as they are added and separated by "/" characters. Example event identifier structures include "/system/workflow/started/data", "/system/workflow/ended/data", "/system/workflow/error/data", "/system/task/entered/data", "/system/task/exited/data", "system/task/error/data", "/custom/item/created", etc. Examples of data that may be specified include a workflow identification number, a workflow type, an identification number associated with an item or product associated with the workflow, etc.

In some embodiments, an event notification may default to providing all data in a set of data associated with an event. In some embodiments, only specified data may be provided, for example, data specified in the event definition. Note that most of the workflow events discussed above may be classified under a "/system/" segment, or namespace. In addition, one of the examples is classified under a "/custom/" namespace, as discussed elsewhere in more detail. With reference to the custom namespace example above, an item may identify, for example, a product or service offered by client of a configurable workflow service.

In at least some embodiments, an event monitoring service is configured to allow clients of a configurable workflow service to subscribe to events. For example, an event monitoring service may be configured to allow clients to provide a path expression and optionally a filter expression to the event monitoring service, as discussed in more detail below. Filter expressions may be employed to provide additional flexibility by matching specific events based on an event type and on the data carried by the event.

Generally a subscriber to an event monitoring service may desire to have event notifications delivered to application code associated with the subscriber so that some action can be taken. In at least some embodiments, a subscriber may register a subscription (e.g., a path and filter) with the event monitoring service as well as an identifier for a component (web service, REST service, API, etc.), which the subscriber may call in response to a notification from the event monitoring service of a matching event. An event monitoring service may typically employ some kind of messaging infrastructure to deliver event notifications.

Subscribers of the event monitoring service may desire to take certain actions in response to the occurrence of an event, such as creating a new workflow instance. In at least some embodiments, an event monitoring service may be configured to automatically perform defined actions in response to occurrence of an event. For example, instead of a workflow instance calling an API to create a new workflow instance upon receiving an event notification from an event monitoring service, the event monitoring service may automatically create the new workflow instance.

When using a domain-specific notation, if an application wants to receive notifications of an event such as the creation of an item, the application may specify to the event monitoring service the task and workflow which corresponds to the domain-specific notation. This may introduce significant coupling between a producer of workflow events and a consumer of workflow events (e.g., a subscriber to the event monitoring service), and if the organization of the producer workflow changes, events may be lost or be misread. At least some embodiments facilitate a subscriber responding to an occurrence of an event without requiring the subscriber to specify a workflow and task identifier associated with the event by employing custom event subscriptions, as discussed in more detail below. For example, for most workflow management systems a workflow is described in some description language, often in XML (such as BPEL, XLang, XPDL). Custom events may be described as a part of this language and may be considered a component of the workflow definition. As discussed in more detail below, an event library may be provided for clients to browse and subscribe to the events via some management tool.

The configurable workflow service and/or event monitoring service may further be a fee-based service in at least some embodiments, such that clients of the service are customers that pay fees to the service for at least some of the functionality provided by the service, as discussed in more detail elsewhere.

Thus, use of the event monitoring service may provide various benefits in various embodiments and situations, including to subscribe to event notifications, to facilitate building of workflow compositions and selection of events from an event library, to decouple producer and consumer workflows, etc. Additional benefits are discussed elsewhere herein, and will otherwise be appreciated by those skilled in the art.

For illustrative purposes, some embodiments are described below in which specific instances of defining and implementing workflows are provided in specific ways, including with respect to specific types of data, specific types of data manipulation operations, and specific types of storage services, execution services and event monitoring services. These examples are provided for illustrative purposes and are simplified for the sake of brevity, and the inventive techniques can be used in a wide variety of other situations, some of which are discussed below, and the techniques are not limited to use with particular types of data, storage or other devices, computing systems or computing system arrangements.

FIG. 1 is a network diagram that illustrates an example embodiment of a configurable workflow service 110 that manages creation and execution of defined workflows for various clients of the configurable workflow service. As part of implementing a defined workflow, the configurable workflow service 110 further provisions particular computing nodes to each perform specified activities corresponding to the defined workflow. In some embodiments, the configurable workflow service 110 optionally provides a group of computing nodes 140 on which defined workflows for clients may be executed. In other embodiments, some or all of the computing nodes used by the configurable workflow service may be provided externally to the configurable workflow service, such as by a client on whose behalf the defined workflow is implemented, by one or more online execution services, etc. In addition, in some embodiments, the configurable workflow service 110 optionally includes one or more storage nodes 150 on which data may be stored to facilitate the execution of defined workflows. For example, the storage nodes 150, if present, may be used to store intermediate data results that are produced during execution of a defined workflow, and in some embodiments may further be used to store source data that is provided to a defined workflow and/or final output data produced by a defined workflow. While not illustrated in FIG. 1, the configurable workflow service may be implemented using one or more configured computing systems, as described in greater detail with respect to FIG. 3 and elsewhere.

FIG. 1 further illustrates one or more networks 190, and various client computing systems 160 via which clients of the configurable workflow service 110 may interact with the service 110 to define and execute workflows. The network(s) 190 of FIG. 1 may include any appropriate network or combination of networks, including an intranet, the Internet, one or more private networks with access to and/or from the Internet, a cellular network, a local area network, or any other such network or combination thereof. Communications over the networks may be enabled by wired or wireless connections and combinations thereof.

In some embodiments, the configurable workflow service 110 may provide one or both of a GUI (not shown) and/or an API (not shown), such as to enable clients to perform various interactions with the service 110. For example, a user representative (not shown) of a particular client may locally interact with one of the client computing systems 160 to cause further interactions to occur with the configurable workflow service 110 over the network 190. The user may, for example, interact with a workflow editor module 120 of the configurable workflow service, via which the user may define one or more workflows of interest for the client. As part of the interactions with the user, the configurable workflow service 110 may store various client information 112 regarding the client and optionally the user representative, and may store a particular definition of a newly defined workflow for the client as part of information 114. In some embodiments, the defining of a particular workflow may include actions by the user in selecting one or more defined workflow components and specifying the interactions between those workflow components, such as by using one or more predefined system-provided workflow component definitions 116—in other embodiments, the configurable workflow service 110 may not provide any such system-provided predefined workflow components. As part of defining a new workflow, the user may further specify one or more source locations at which source data is to be retrieved and used for the workflow definition, and one or more destination locations to which data that is produced by the defined workflow will be provided. The various information 112, 114, 116, 118 (discussed below), 119 (discussed below) used by the configurable workflow service 110 may further be stored on one or more systems that support or provide the configurable workflow service 110, such as a database of the configurable workflow service, although such systems are not illustrated with respect to FIG. 1.

In addition, the user representative of the client may optionally in some embodiments define one or more new workflow components as part of defining a new workflow, and if so, such client-defined workflow components may further have definition information stored in information 116 in at least some embodiments. While a client-defined workflow and any client-defined workflow components may in some embodiments be treated as private unless otherwise specified by the client (e.g., to be accessible or otherwise visible only to that client unless other specified), in other embodiments and situations, at least some such client-specific information may instead be made available to other clients in specified circumstances, such as to enable other clients to use some or all of the client's defined workflow components and/or workflows (e.g., for a fee or for other benefits provided to the client who defined such information, if the client who defined such information approves use by others, etc.). In a similar manner, source data used by a client's defined workflow and final output data produced by a client's defined workflow may in at least some embodiments be treated as private to that client unless otherwise specified, although in other embodiments some or all such source data and/or final output data may instead be made available to other clients in specified circumstances (e.g., for a fee or for other benefit to the client with which that data is associated, if the client associated with such information approves use by others, etc.).

When a client indicates one or more storage locations from which source data may be obtained and/or to which final output data may be provided for a defined workflow, such storage locations may have various forms in various embodiments. As one example, in at least some embodiments, the configurable workflow service may be integrated with or otherwise affiliated with one or more particular optional online storage services 145, such as to form a single system 105 (e.g., a single system that is operated by a single entity). If so, interactions 147 with such optional online storage services 145 may be performed to retrieve source data and/or to store final output data. Furthermore, in at least some embodiments, intermediate data results that are generated during execution of a workflow may similarly be stored in such online storage services 145, such as to be produced by a first part of the defined workflow and to be later accessed and used by a second defined part of the workflow, whether in addition to or instead of one or more optional storage nodes 150. Moreover, in at least some embodiments and situations, one or more online storage services 180 are available over the network 190 to the client computing system 160 and to the configurable workflow service 110, and may be used in a similar manner over the network(s) 190, whether in addition to or instead of some or all of the optional online storage services 145. In addition, in at least some embodiments and situations, a particular client may provide one or more client-specific storage systems or other storage locations using one or more other computing systems 185, which may similarly be used over the network(s) 190.

After a client has interacted with the configurable workflow service to define a workflow, the client may further interact with a workflow engine module 130 of the configurable workflow service to initiate execution of the defined workflow. The execution of a particular workflow may be initiated in various manners, such as to be performed immediately upon a corresponding instruction from the client, to occur at a specified future time or when other specified criteria (such as for one or more defined preconditions) are satisfied that will initiate execution of the workflow, etc. As with the workflow editor module 120, the workflow engine module 130 may in some embodiments provide a GUI interface and/or and API interface for use by clients. When the execution of a defined workflow is initiated, the workflow engine module 130 in the example embodiment retrieves workflow definition information for that defined workflow from the information 114, and initiates the execution of the defined workflow on one or more computing nodes. In particular, the workflow definition may be constructed with various logical nodes that each correspond to defined operations and are interconnected in various manners, and the workflow engine module 130 may select particular computing nodes to use to perform particular such operations, as well as to further perform activities to provision and initiate execution of corresponding workflow worker processes on each such selected computing node. As part of provisioning such computing nodes and/or of executing workflow worker processes on the computing nodes, additional interactions with one or more storage locations may be performed to obtain input data to be used and/or to store results data that are produced, including for intermediate results data for use by other workflow worker processes of the defined workflow.

Some or all of the computing nodes used to implement a defined workflow may, for example, be selected from optional computing nodes 140 provided by the configurable workflow service 110, if present, and workflow worker processes 142 may be executed on those computing nodes to implement the defined operations. In other embodiments, the workflow engine module 130 may use computing nodes that are not provided by the configurable workflow surface 110, whether instead of or in addition to the optional computing nodes 140. For example, in some embodiments and situations, a particular client may provide or otherwise control one or more other computing systems 185, and the workflow engine 130 may configure and use such other computing systems 185 as computing nodes for use in executing that client's defined workflow. In addition, in some embodiments, one or more online program execution services 148 and/or 183 may be available for use in executing programs in various manners, and if so may be used to provide computing nodes (not shown) to execute some or all of a particular client's defined workflow—for example, the workflow engine module 130 may provision and initiate execution of particular workflow worker processes on particular computing nodes provided by such online program execution services. As one example, in at least some embodiments, the configurable workflow service may be integrated with or otherwise affiliated with one or more particular optional online program execution services 148 (whether in addition to or instead of one or more optional storage services 145), such as part of a single system 105 as described above. If so, interactions 149 with such optional online program execution services 148 may be performed to provision computing nodes, initiate execution of particular workflow components, receive output data produced by particular workflow components, etc.

After a client has interacted with the configurable workflow service to define a workflow, the client may further interact with an event monitoring engine module 170 of the configurable workflow service and/or a separate online event monitoring service 175, 179 to subscribe to events of the defined workflow so as to cause notification to be provided upon the occurrence of events, to define actions to be automatically initiated or performed by the event monitoring engine 170 or the online event monitoring service in response to the occurrence of events, etc. As with the workflow editor module 120, the event monitoring engine module 170 or the online event monitoring service 175 may in some embodiments provide a GUI interface and/or and API interface for use by clients. In some embodiments, the event monitoring engine module 170 may store subscription definitions as part of information 118, and may maintain an event library 119 to allow users to select events associated with one or more defined workflows to which to subscribe. When an event occurs during the execution of a defined workflow, the event monitoring engine module 170 in the example embodiment determines whether a match for the event is defined in the information 118, and if so retrieves event subscription definition information for that matching event from the information 118, and initiates one or more actions based on the event subscription definition information, such as the providing of a notification, the initiation of another workflow, the termination of another workflow, the completion of a task, the assignment/reassignment of a task, etc. In some embodiments, a default action may be taken in response to a determination that a match for an event is defined in the event subscription information, such as providing a notification to one or more subscribers. Instead of or in addition to the event monitoring engine 170, some embodiments may employ one or more online event monitoring services 175. If so, interactions 177 with such optional event monitoring services 175 may be performed to subscribe to events, to provide indications of the occurrence of events to the event monitoring service, to receive event notifications from the event monitoring service, to receive instructions to initiate or terminate workflow instances, etc.

In some embodiments, one or more online program execution services 148 and/or 183 may be available for use in executing programs in various manners, and if so may be used to provide computing nodes (not shown) to execute some or all of a particular client's defined workflow—for example, the workflow engine module 130 may provision and initiate execution of particular workflow worker processes on particular computing nodes provided by such online program execution services. As one example, in at least some embodiments, the configurable workflow service may be integrated with or otherwise affiliated with one or more particular optional online program execution services 148 (whether in addition to or instead of one or more optional storage services 145), such as part of a single system 105 as described above. If so, interactions 149 with such optional online program execution services 148 may be performed to provision computing nodes, initiate execution of particular workflow components, receive output data produced by particular workflow components, etc.

In other embodiments, the configurable workflow service 110 and/or a separate event monitoring service 175 and/or 179 may perform additional techniques, such as to generate and provide an event library, to perform additional activities with respect to managing event notifications, managing responses to events, etc. In addition, the configurable workflow service 110 and/or a separate event monitoring service 175 and/or 179 may be implemented in some embodiments based on software instructions that execute on one or more server computing systems to program or otherwise configure the server computing system(s) to perform some or all of the described techniques, such as to program one or more hardware CPU processors (not shown) of the server computing system(s)—such software instructions may, for example, be used to implement the modules 120, 130 and/or 170, or instead the functionality of the configurable workflow service or a separate event monitoring service may be provided using other types of modules.

In this manner, the configurable workflow service 110 and/or a separate event monitoring service provides various benefits to various external clients, including to enable clients to subscribe to event notifications, compose workflow combinations, automatically initiate various actions in response to workflow events, etc. Additional details related to particular operations of the configurable workflow service 110 and/or a separate event monitoring service 175 and/or 179 are included elsewhere herein.

Although the foregoing example embodiment of FIG. 1 is described with respect to a configurable workflow service 110 that provides various types of functionality in conjunction with one or more client systems that each may have one or more associated users, it will be appreciated that various other embodiments may exist. For example, in at least some embodiments and situations, a client may represent an organization or other group (e.g., a company that has multiple people instead of an individual person). Thus, a client entity may have various forms in various embodiments.

In some embodiments, the configurable workflow service 110 and optionally any online storage services, online program execution services and/or online event monitoring services that are used may each operate according to one or more fee-based structures or agreements. For example, access to some or all of the described techniques from the configurable workflow service 110 may in some embodiments be provided in a fee-based or other paid manner to a provider or operator of the configurable workflow service 110 and/or to at least some client systems that use described techniques of the configurable workflow service 110. As one example, clients of the configurable workflow service 110 may pay one-time fees, periodic (e.g., monthly) fees, and/or one or more types of usage-based fees to use functionality provided by the configurable workflow service 110. Such fees may be based on one or more factors and activities, such as indicated in the following non-exclusive list: based on a quantity and/or type of interactions performed to define a particular workflow; a size and/or type of a defined workflow and/or of some or all of its defined workflow components; based on usage of a defined workflow, such as a measure of computing resources used in executing a defined workflow (e.g., a quantity of computing nodes used), a measure of processor capability used (e.g., CPU cycles), an amount of time that occurs during the execution of the defined workflow, activities in provisioning computing nodes for a defined workflow, amount of time during which computing nodes that are provisioned for a defined workflow are unavailable for other use, such as while those computing nodes wait for source data to be available or other preconditions to be satisfied, based on a quantity of data that is stored and/or transferred, such as based on a size of the data, an amount of time of the storage, etc.; based on content or other characteristics of particular data groups that are stored, manipulated and/or produced; etc.

FIG. 2A illustrates an example of generating events during execution of a workflow for a client and of providing notifications to subscribers of the occurrence of the events. A particular workflow 210 for a particular client of the configurable workflow service 110 (referred to in this example as "Customer C") is illustrated as a simplified workflow graph showing the events that are generated as the workflow is executed. In some embodiments, as the workflow 210 is executed event definitions are automatically generated by the workflow service as certain events occur. The event definitions may take various forms, such as "/system/workflow/started/data", "/system/workflow/ended/data", "/system/workflow/error/data", "/system/task/entered/data", "/system/task/exited/data", "system/task/error/data", "/custom/item/created", etc.). In some embodiments, a workflow definition (see workflow definitions 114 of FIG. 1) may include indications to generate events which cause the events to be automatically generated in response to the indications as the workflow 210 is executed.

As discussed above, examples of optional data that may be specified include a workflow identification number, a workflow type, an identification number associated with an item or product associated with the workflow, etc. FIG. 2B, discussed in more detail below, illustrates an example of the structure of a generated event. As illustrated in FIG. 2A, the workflow 210 starts at 212, and the event 214 "workflow started" is automatically generated in response. When task A 216 starts, event 218 "task A started" is automatically generated. When task A 216 ends, event 220 "task A ended" is automatically generated. When task B 222 starts, event 224 "task B started" is automatically generated. When task B 222 ends, event 226 "task B ended" is automatically generated. The process repeats for each task of the workflow 210, including for a last task N. As illustrated, when task N 228 starts, event 230 "task N started" is automatically generated, and when task N 228 ends, event 232 "task N ended" is automatically generated. When the workflow 210 ends at 234, event 236 "workflow ended" is automatically generated. The workflow service 110 may execute other workflows 238 and perform various other actions, such as billing, etc.

As illustrated in FIG. 2A, the workflow service 110 provides the generated events to an online event monitoring service 175. In some embodiments, the generated events may be provided to an event monitoring engine module of the workflow service 110 (see event monitoring engine 170 of FIG. 1). The online event monitoring service retrieves information from subscription definitions 118 associated with received events, and provides notifications 240 to subscribers 242 and/or takes other actions as appropriate (e.g., initiating workflow instances, terminating workflow instances, completing tasks, assigning/reassigning tasks, etc.).

FIG. 2B illustrates an example data structure of a generated event 245. The illustrated event 245 comprises a path 247, which is a data string (e.g., identifying a particular workflow system 110 or a particular customer of the workflow system 110 that generated the event, and/or providing an indication that the event is a custom event, etc.), a workflow identifier 249, which is a data string (e.g., identifying a particular workflow that generated the event), a task identifier 251, which is a data string (e.g., identifying a particular task that generated the event), and an instance identifier 253, which may be a unique identifier of the particular workflow instance that generated the event. One or more of the workflow identifier 249, the task identifier 251 and the instance identifier 253 may be omitted or employ values to indicate other information in some embodiments. For example, the task identifier may be omitted when an event is not associated with a particular task or may have a particular value to indicate no task is associated with the generated event. In another example, one or more of the workflow identifier 249, the task identifier 251 and the instance identifier 253 may be omitted when a generated event is a custom event. Some embodiments may include additional data in an event structure, such as a separate indicator of an event type (e.g., a custom event), such as when it is desired to include an identifier of the system generated the event in custom events. In some embodiments, the structure of an event may be fixed (e.g., may have a specific structure of data included in the event).

As illustrated, event 245 includes optional data, which is organized as a series of key-value pairs 255, 257, 259 for DATA A to DATA N. The key is a data string identifying a data type associated with the value, which is a data string providing the value for the data type (e.g., a key may indicate that the value identifies a workflow type, and the value provides an indication of the workflow type, etc.).

As mentioned above, an event monitoring service may be configured to allow clients of a configurable workflow service to subscribe to events. For example, an event monitoring service may be configured to allow clients (e.g., subscribers of the event monitoring service) to provide a path expression and optionally a filter expression to the event monitoring service. A path expression may take the form of a path with a "*" replacing specific segments to match groups of events. For example: "/system/workflow/started" matches only workflow start events; "/system/workflow/*" matches workflow start, stop and error events; "/custom/item/*" matches all custom item events; "/*" matches all events, etc.

Filter expressions may be employed to provide additional flexibility by matching specific events based on an event type and on the data carried by the event. Path filters may be expressed in a number of language forms, such as JSP Expression Language used in the Java system, Lightweight Directory Access Protocol (LDAP) syntax used in some systems (notably the Open Services Gateway Initiative (OSGi)), etc. A path filter may include a key identifying a part of an event path to check for a match, and one or more corresponding values for which a match is detected. Examples of path filter expressions include: "(workflow=myWorkflow)" which matches only events generated by the named workflow; "(& (workflow=myWorkflow)(task=myTask))" which matches only events generated by the named task in the named workflow; "(itemId=873645435)" which matches based on custom key/value data pairs, etc.

Generally a subscriber to an event monitoring service may desire to have event notifications delivered to application code associated with the subscriber so that some action can be taken. In at least some embodiments, a subscriber may register a subscription (e.g., a path and filter) with the event monitoring service as well as an identifier for a component (web service, REST service, API, etc.), which the subscriber may call in response to a notification from the event monitoring service of a matching event. An event monitoring service may typically employ some kind of messaging infrastructure to deliver event notifications. For example to deliver a notification to a specific component, an event monitoring service may add the event to a message queue from which the event monitoring service, a messaging service or the component reads.

As mentioned above, subscribers of the event monitoring service may desire to take certain actions, such as creating a new workflow instance, in response to the occurrence of an event. For example, a subscriber may wish to respond to a notification of an occurrence of an event associated with a first type of workflow instance by creating a second workflow instance, which may be of a different type. In at least some embodiments, an event monitoring service may be configured to automatically create a new workflow instance in response to occurrence of an event associated with another workflow instance. For example, instead of a workflow instance calling an API to create a new workflow instance upon receiving an event notification from an event monitoring service, the event monitoring service may automatically create the new workflow instance. This may facilitate streamlining a common use case for workflow compositions comprising multiple workflows. Additional actions may be automatically initiated or performed by an event monitoring service, for example for other common desired responses to workflow events, such as terminating another existing workflow, completing tasks, assigning/re-assigning tasks, etc.

As mentioned above, when using a domain-specific notation if an application wants to receive notifications of an event such as the creation of an item (e.g., a product), the application specifies to the event monitoring service the task and workflow which corresponds to the domain-specific notation. This may introduce significant coupling between a producer of workflow events and a consumer of workflow events (e.g., a subscriber to the event monitoring service), and if the organization of the producer workflow changes, events may be lost or be misread. At least some embodiments facilitate a subscriber responding to an occurrence of an event without requiring the subscriber to specify a workflow and task identifier associated with the event by employing custom event subscriptions.

Custom events may be generated from the same locations as system events (e.g., workflow start/end/error, workflow task enter/leave/error), while allowing the workflow to provide a custom, domain-specific event path. FIG. 2C illustrates events generated by an embodiment of a task 270 including a custom event definition. When the task 270 is started, a task started event 272 is generated. In addition, a custom event 274 is generated. When the task ends, a task ended event 276 is generated. These domain-specific events may be published by the source workflow using the event monitoring service and the actual location of the event definition may change in different versions of the workflow while a logical event name remains stable.

As mentioned above, for most workflow management systems, a workflow is described in some description language, often in XML (such as BPEL, XLang, XPDL). Custom events may be described as a part of this language. For example, XML nodes may be added with names such as "onStart", "onEnd" or "onError" underneath the "workflow" XML element; a "task" XML element may have an "onEnter" and "onExit" XML element, etc. Custom events may include filters to limit the data. For example, a workflow including a custom event may be described as follows:
<workflow>
<on End eventPath="/custom/thing/created"/>

<task id="my task">
<on Enter eventPath="/custom/thing/something">
<data key="itemId" value=" . . . "/>
</on Enter>
. . . .

Additionally, the event elements may have child "data" elements that copy data from the workflow instance into the event key/value set. This facilitates a custom event carrying desired information, for example in "an item was created" event, the item identifier may be added to the event.

As noted above, custom events may be considered a component of the workflow definition and an event monitoring service (or a workflow service) may provide an event library, such as a listing of custom events, and allow clients to browse the events published and subscribe to the events via some management tool. To facilitate providing an event library, the definitions of custom events may include descriptive elements to allow clients to understand the purpose of events listed in the event library. For example,
<workflow>
<on End eventPath="/custom/thing/created">
<description xml:lang="en-us">
An item was created, the new item identifier is included
In the event with the key "itemId".
</description>
</onEnd>

As mentioned above, the configurable workflow service and/or the event monitoring service may further be a fee-based service in at least some embodiments, such that clients of the configurable workflow service or the event monitoring service are customers that pay fees to the service for at least some of the functionality provided by the service. In addition, when one or more online storage services, online execution services and/or online event monitoring services are used by a configurable workflow service as part of providing workflow services for a particular client, such other services may also optionally charge fees for such use, whether via the configurable workflow service or directly to the client.

It will be appreciated that the examples of FIGS. 2A, 2B and 2C and the discussion above are provided for illustrative purposes, and that the disclosure is not limited by the details discussed with respect to those examples.

Figure 3:
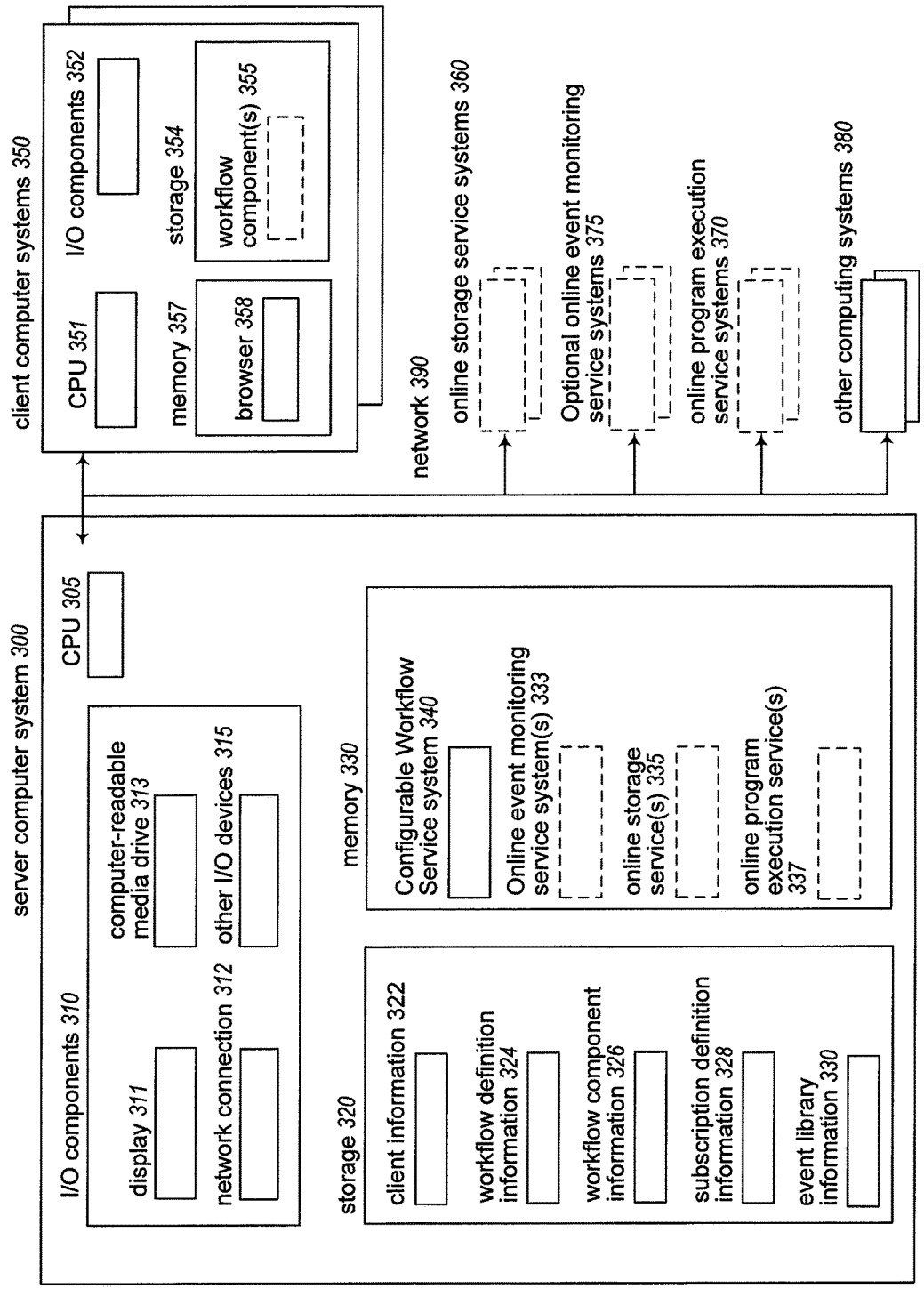
FIG. 3 is a block diagram illustrating an example embodiment of a computing system configured to provide an event monitoring service to clients of a configurable workflow service that manages use of defined workflows for supported client systems.

FIG. 3 is a block diagram illustrating an example embodiment of a computer system suitable for performing techniques to manage the definition and implementation of workflows for supported client systems and the providing of event monitoring services associated therewith. In particular, FIG. 3 illustrates a server computer system 300 suitable for executing an embodiment of a system 340 that provides a configurable workflow service, as well as various client computer systems 350, optional online storage service systems 360, optional online program execution service systems 370, optional online event monitoring service systems 375, and other computing systems 380. In the illustrated embodiment, the computer system 300 has components that include one or more hardware CPU processors 305, various I/O components 310, storage 320, and memory 330, with the illustrated I/O components including a display 311, a network connection 312, a computer-readable media drive 313, and other I/O devices 315 (e.g., a keyboard, a mouse, speakers, etc.). In other embodiments, the computer system 300 may have more or less components than are illustrated, and the local storage 320 may optionally be provided by one or more non-volatile storage devices that are included within or otherwise locally attached to the computer system 300.

In addition, the illustrated client computer systems 350 have components similar to those of computer system 300, including a CPU 351, I/O components 352 (although particular components are not illustrated), storage 354, and memory 357. The other systems 360, 370, 375 and 380 may also each include similar components to some or all of the components illustrated with respect to computer system 300, but such components are not illustrated in this example for the sake of brevity. The client computer systems 350 each includes a browser program 358 executing in memory 357, such as to enable a user of such a client computer system to interact, for example, with a Web-based GUI provided by the configurable workflow service system 340 and/or a separate online event monitoring service system 375, etc., and also optionally stores information 355 about client-specific workflow components on the local storage 354, although in other embodiments one or both of these components may not be present on some or all client systems. Furthermore, a particular client computer system 350 may have more or less components than are illustrated.

An embodiment of a configurable workflow service system 340 is executing in memory 330 of computer system 300, such as to include software instructions that, when executed by the CPU 305, program or otherwise configure the computer system 300 to perform automated operations to provide some or all of the described techniques. While not illustrated in FIG. 3, the system 340 may include one or more modules, optionally corresponding to modules 120, 130 and/or 170 of FIG. 1. In addition, the server computer system may further optionally execute one or more online storage services 335, one or more online program execution services 337 and/or one or more online event monitoring services 333 in memory 330, such as to correspond to situations in which the configurable workflow service system 340 is integrated with or otherwise operates in conjunction with such services 335, 337 and/or 333, although the system 340 may instead operate independently of any such other systems in some embodiments. In other embodiments, any such online storage services, online program execution services and/or online event monitoring services that are used by the configurable workflow service system 340 may be accessed over the network 390, such as with respect to optional systems 360, 370 and/or 375.

In this example embodiment, the configurable workflow service system 340 includes functionality related to managing workflow-related functionality for supported client systems, and is further optionally configured to interact with client computer systems 350 and/or other systems and devices over the network 390 (e.g., via the Internet and/or the World Wide Web, via a private cellular network, etc.). The other systems 350, 360, 370, 375 and/or 380 may also each be executing various software as part of interactions with the system 340. Various information related to the operation of the configurable workflow service system 340 (and optionally services 335, 337 and/or 333) may be stored in storage 320 or instead remotely, such as information 322 about particular client systems and/or users, information 324 about one or more particular defined workflows for clients, information 326 about any defined workflow components, information about subscription definitions, and/or information about event libraries, such as in a manner similar to that of information 112-119 of FIG. 1 or as described elsewhere herein. Additional details regarding operations of the system 340 in particular embodiments are described in greater detail elsewhere.

It will be appreciated that systems 300, 350, 360, 370, 375 and 380 are merely illustrative and are not intended to limit the scope of embodiments of the present disclosure. For example, system 340 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a computer system or computing system or computing node may comprise any combination of hardware that can interact and perform the described types of functionality, optionally when programmed or otherwise configured by particular corresponding software instructions, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated system 340 may in some embodiments be distributed in various modules.

It will also be appreciated that, while various items are illustrated as being stored in memory or on storage while being used, these items or portions of them may be transferred between memory and other storage devices for purposes of memory management and data integrity, etc. Alternatively, in other embodiments some or all of the software modules and/or systems may execute in memory on another device and communicate with the illustrated computer systems via inter-computer communication. Thus, in some embodiments, some or all of the described techniques may be performed by hardware means that include one or more processors and/or memory and/or storage when configured by one or more software programs (e.g., by the system 340) and/or data structures (e.g., defined workflow information 324, defined workflow component information 326, defined subscription information 328, event library information 330), such as by execution of software instructions of the one or more software programs and/or by storage of such software instructions and/or data structures. Furthermore, in some embodiments, some or all of the systems and/or modules may be implemented or provided in other manners, such as by using means (e.g., specialized electronics) that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on non-transitory computer-readable storage media, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Figure 4:
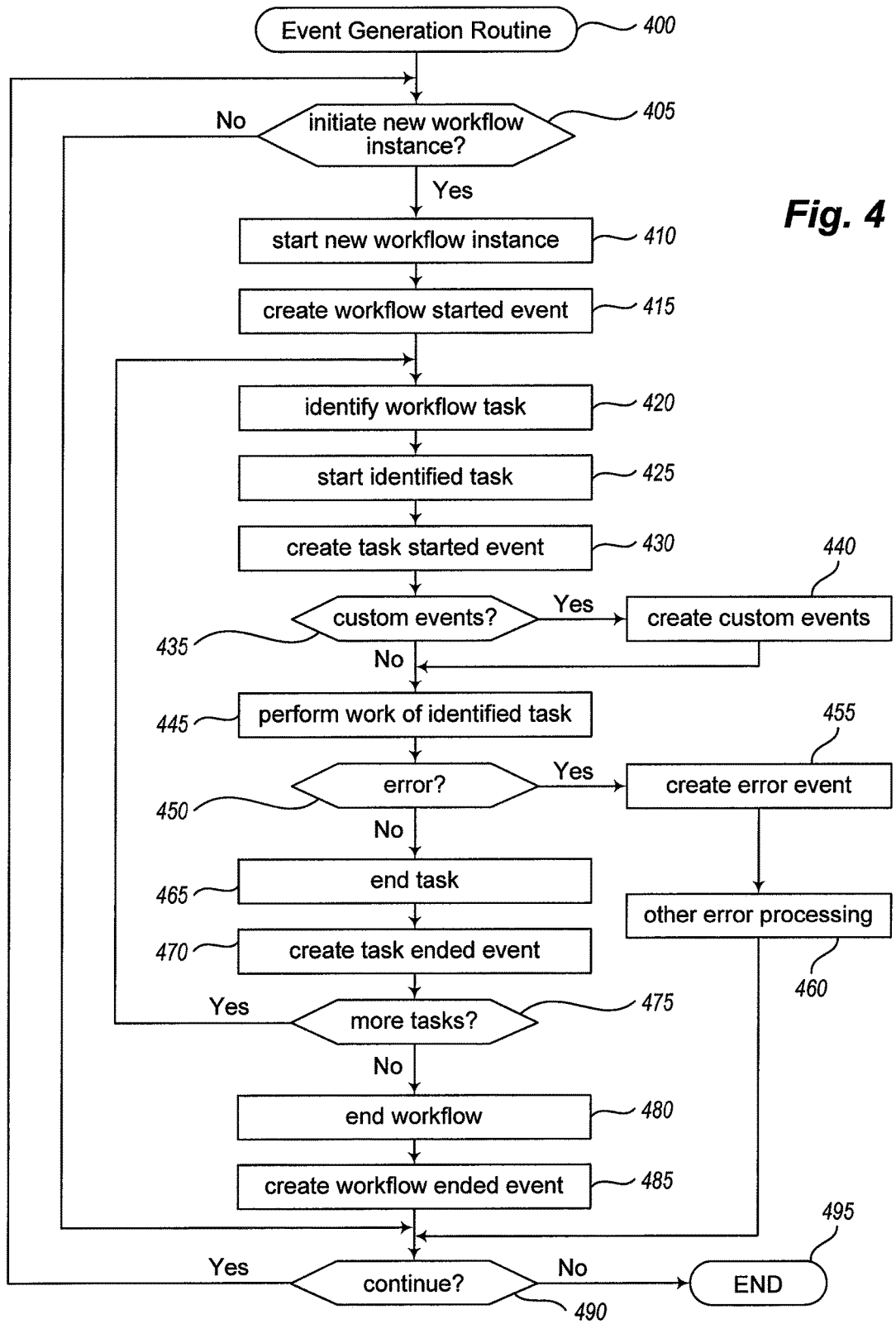
FIG. 4 illustrates an example embodiment of a flow diagram for a Configurable Workflow Service Event Generation routine.

FIG. 4 is a flow diagram of an example embodiment of an Event Generation routine 400. The routine may be provided by, for example, execution of the configurable workflow service 110 of FIG. 1 and/or the configurable workload service system 340 of FIG. 3, such as to manage the the execution of a program instance and the generation of events as the program instance is executed.

In the illustrated embodiment, the routine begins at block 405, where it is determined whether a request to initiate a new instance of a defined workflow has been received. A request to create a new instance may be received from, for example, a client via an API, another workflow instance, an event monitoring service, etc. When it is determined that initiation of a new instance of a defined workflow has not been requested, the routine proceeds from block 405 to block 490. When it is determined that initiation of a new instance of a defined workflow has been requested, the routine continues to block 410, where the new workflow instance is started. The routine proceeds from block 410 to blocm 415, where a workflow started event is automatically created.

The routine continues to block 420, where a workflow task to perform is identified in the defined workflow (e.g., a first or next task of the defined workflow). The routine continues to block 425 where the identified workflow task is started. The routine proceeds to block 430 where a task started event is automatically created.

The routine continues to block 435 where it is determined whether the defined workflow includes one or more indications to generate custom events at a location in the defined workflow corresponding to a start of the identified task. When it is determined that the defined workflow includes one or more indications to generate custom events at the location in the defined workflow corresponding to the start of the identified task, the routine continues to block 440 where one or more custom events corresponding to the indications to generate custom events are created. The routine proceeds from block 440 to block 445. When it is determined that the defined workflow does not include an indication to generate a custom event at the location in the defined workflow corresponding to the start of the identified task, the routine proceeds from block 435 to block 445. Embodiments of an Event Generation Routine may include other or additional blocks to determine whether a defined workflow contains one or more indications to generate a custom event at various locations in the routine, such as when a workflow instance is started, when a workflow instance is terminated, when a task is terminated, during performance of a task, etc.

At block 445, the routine performs the work associated with the identified task, such as manipulating data, etc. The routine proceeds from block 445 to block 450, where it is determined whether any errors occurred, such as errors related to the performance of the identified task. When it is determined at block 450 that one or more errors occurred, the routine proceeds to block 455 where an error event is automatically created. The routine proceeds from block 455 to block 460, where other error processing may occur. The routine proceeds from block 460 to block 490. When it is determined at block 450 that no errors occurred, the routine proceeds from block 450 to block 465. At block 465, the routine ends the identified task and proceeds to block 470, where task ended event is automatically created. Embodiments of an Event Generation Routine may include other or additional blocks to determine whether errors have occurred, such as a block to determine whether an error has occurred before a workflow instance is terminated, etc.

The routine proceeds from block 470 to block 475, where it is determined whether more tasks in the defined workflow remain to be performed. When it is determined that more tasks in the defined workflow remain to be performed, the routine proceeds from block 475 to block 420. When it is determined that no more tasks in the defined workflow remain to be completed, the routine proceeds from block 475 to block 480.

At block 480, the defined workflow ends and the routine proceeds to block 485. At block 485, a workflow ended event is automatically created. The routine proceeds from block 485 to block 490.

At block 490, the routine determines whether to continue, such as in response to an explicit instruction to terminate. If it is determined to continue, the routine continues to block 405, and otherwise continues to block 495 and ends.

Figure 5:
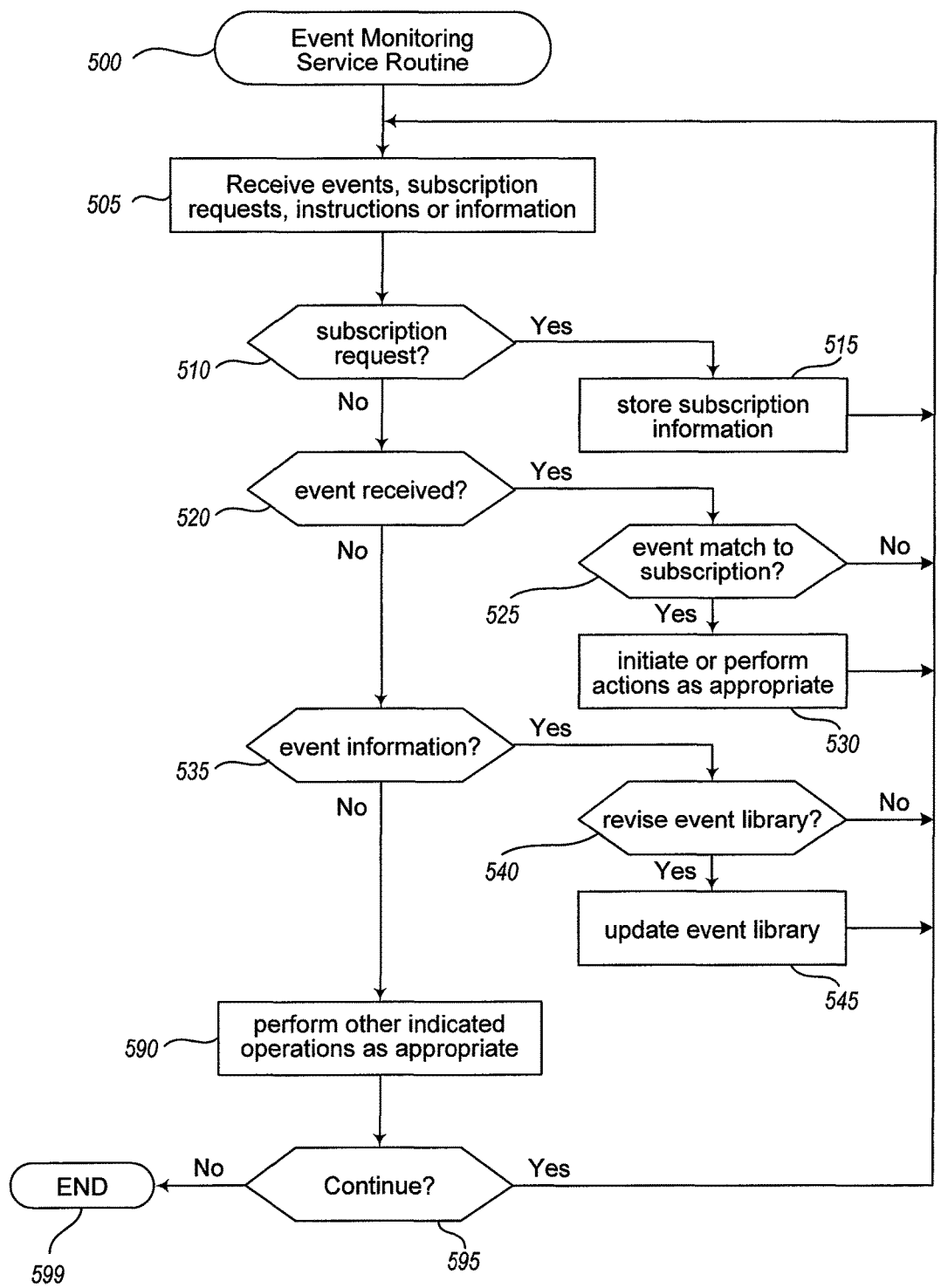
FIG. 5 illustrates an example embodiment of a flow diagram for an Event Monitoring Service routine.

FIG. 5 is a flow diagram of an example embodiment of an Event Monitoring Service Routine 500. The routine may be provided by, for example, execution of the event monitoring engine 170 of FIG. 1, the online event monitoring service 175 of FIG. 1, the configurable workload service system 340 of FIG. 3, the online event monitoring service 333 of FIG. 3 and/or the online event monitoring service system 375 of FIG. 3, such as to manage the response to events associated with various workflows.

In the illustrated embodiment, the routine begins at block 505, where an event, a subscription request, an instruction or information is received related to managing responses to events associated with one or more workflows. An event may be received, for example, from a configurable workflow service executing a workflow instance. Subscription requests, instructions or information may be received from, for example, a client via an API, an executing workflow instance, a configurable workflow service, etc. The routine continues to block 510 to determine if an event subscription request has been received. If so, the routine continues to blocks 515 to obtain and store information related to the event subscription request. In some embodiments and situations, the event monitoring service and/or a configurable workflow service may provide a user interface via which a user representative of the client interactively receives information related to available events for subscription (such as information maintained in an event library) and specifies information for the event subscription request, while in other embodiments the information to use to define an event subscription request may instead be included in the event subscription request or received via one or more programmatic interactions from one or more executing programs on behalf of the client.

It will be appreciated that the definition of an event subscription request via a user interface of the event notification service may involve multiple successive interactions by a user representative of the client, with the a service optionally updating and providing additional or alternative information to the user via a user interface based on prior selections that have been made. Thus, the functionality of block 515 may include multiple iterative activities by the event monitoring service and/or a configurable workflow service in some embodiments and situations.

The event subscription information may include information to identify matching events such as, for example, a path expression, filter information to use to determine event matches to a subscription request (e.g., event types to match), a logical event identifier (e.g., a name of a custom event), etc. The event subscription information may also include information regarding actions for the event monitoring service to initiate or perform in response to an event, such as, for example, workflows, applications, etc., to be notified of the occurrence of the event, workflows to be initiated, terminated or modified in response to the event, etc. The event subscription information may also include information related to publishing available events, such as information regarding including events in an event library (e.g., which workflows may see the event in the library, etc.). If so, in block 515 the routine may also update an event library identifying events available for subscription. Information related to publishing available events may also be received in some embodiments separately from a received event subscription request, as discussed below with respect to blocks 535-545. After block 515, the routine returns to block 505. It is noted that an event subscription request may be a request to modify or delete one or more existing event subscriptions.

If it is instead determined in block 510 that a subscription request was not received, the routine continues instead to block 520 to determine if an event has been received. If so, the routine proceeds to block 525 to determine if one or more stored event subscriptions are a match for the received event (e.g., by determining whether an event path matches a path specified in an event subscription and whether any filter criteria are satisfied). If so, the routine proceeds to block 530 to determine and initiate or perform one or more actions as appropriate in response to the event match, such as initiating or providing one or more event notifications, initiating, terminating or modifying one or more workflow instances, completing one or more existing tasks, assigning one or more existing tasks, reassigning one or more existing tasks, etc. The one or more actions to be taken may be determined based on the stored event subscription information associated with the matching event(s), information contained in the event (e.g., the type of event, a key/data pair, etc.), other information (e.g., the status of other workflows, other received events, etc.), information received in response to a query (e.g., a query to select one or more instances to terminate), etc., and various combinations thereof.

For example, when it is determined to create a new instance of a defined workflow in response to the event matching, information sufficient to create the new instance (e.g., information sufficient to identify one or more unique workflow definitions and any initial data) may be obtained in various manners, such as from the stored event subscription information, information contained in the the event, information stored in other locations (e.g., an event library), a query (e.g., an automated query, a query to a user, such as a subscriber), etc., and various combinations thereof (e.g., information in the event or the stored event subscription information may be sufficient to identify a set of defined workflows, and a subscriber may be queried to select a defined workflow from the set, information stored in an event may specify criteria and an automated query may identify a unique matching defined workflow). In another example, when it is determined to terminate an existing instance, information sufficient to terminate the instance (e.g., information sufficient to identify one or more unique instances to terminate) may be obtained in various manners, such as from the stored event subscription information, information contained in the the event, information stored in other locations (e.g., an event library), a query (e.g., an automated query, a query to a user, such as a subscriber), etc., and various combinations thereof (e.g., information in the event or the stored event subscription information may be sufficient to identify a set of instances, and a subscriber may be queried to select one or more instances to terminate from the set, information stored in an event may specify criteria and an automated query may identify one or more unique instances). In another example, when it is determined to complete an existing task (e.g., a task that was waiting for the event to occur), information sufficient to complete the task (e.g., information sufficient to identify a unique instance associated with the task and to provide any related data to the task) may be obtained in various manners, such as from the stored event subscription information, information contained in the the event, information stored in other locations (e.g., an event library), a query (e.g., an automated query based on provided criteria, a query to a user, such as a subscriber), etc., and various combinations thereof (e.g., information in the event or the stored event subscription information may be sufficient to identify a set of instances, and a subscriber may be queried to select an instance from the set, information in the event or the stored event subscription information may specify a criteria, and a query may identify one or more unique instances). In another example, when it is determined to assign or reassign an existing task, information sufficient to assign the task (e.g., information sufficient to identify one or more unique instances and an assignee) may be obtained in various manners, such as from the stored event subscription information, information contained in the the event, information stored in other locations (e.g., an event library), a query (e.g., an automated query based on provided criteria, a query to a user, such as a subscriber), etc., and various combinations thereof (e.g., information in the event or the stored event subscription information may be sufficient to identify a set of instances or a set of assignees, and a subscriber may be queried to select one or more instances or assignees from the set, information in the event or stored event information may specify a criteria, and a query may identify a unique instance or assignee). At least some embodiments may employ error processing in block 530, such as to address cases where no instances are found to act upon, cases where more than one instance was found when only one instance was expected, etc. Such error processing may include, for example, default error responses, such as providing error information to a subscriber, selecting a default instance to act upon, etc. In some embodiments, the event and/or the stored event information may indicate a response to take in the event of an error.

The routine proceeds from block 530 to block 505. If it is determined at block 525 that the event does not match a stored event subscription, the routine proceeds from block 525 to block 505.

If it is not determined at block 520 that an event was received, the routine proceeds to block 535 to determine whether information pertaining to publication of events has been received. Such information may be received from a client, a workflow, a configurable workflow service (for example, after defining a workflow, a configurable workflow service may provide information related to the event definitions included in the workflow to the event monitoring service), an application, another routine of the event monitoring service (e.g., a routine configured to scan stored workflow definitions to identify custom events in the workflow definitions), etc. If so, the routine proceeds to block 540 to determine whether to revise an event library based on the received information. If it is determined to revise the event library, the routine proceeds to block 545 to update the event library. After updating the event library in block 545, the routine proceeds to block 505. If it is determined at block 540 to not revise the event library, the routine proceeds from block 540 to block 505. If it is determined at block 535 that event publication information was not received, the routine proceeds to block 590 to perform one or more other indicated operations as appropriate. The operations performed with respect to block 590 may have various forms in various embodiments and at various times, including to modify or remove event subscriptions, stop or otherwise modify notification procedures (e.g., to change to a different messaging service), etc.

The routine continues to block 595 to determine whether to continue, such as until an explicit indication to terminate is received. If it is determined to continue, the routine continues to block 505, and otherwise continues to block 599 and ends.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
    implementing, by one or more first configured computing systems of a configurable workflow service having a plurality of clients, a first defined workflow for a client of the plurality, by:
        receiving, by the configurable workflow service and via one or more first electronic communications sent over one or more computer networks from a first client device of the client, information from the client to describe multiple workflow components for the first defined workflow; and
        executing, by the configurable workflow service, the first defined workflow using hardware resources of the configurable workflow service, and providing information to a separate event monitoring service about multiple events occurring during the executing, the multiple events including a workflow start event when the first defined workflow starts, a workflow component start event when each of the multiple workflow components starts, a workflow component end event when each of the multiple workflow components ends, and a workflow end event when the first defined workflow ends; and
    implementing, by one or more second configured computing systems of the event monitoring service, one or more computer-implemented actions in response to the multiple events, by:
        receiving, by the event monitoring service and via one or more second electronic communications sent over the one or more computer networks from a second client device of a subscriber user, event subscription information from the subscriber user that describes types of computer-implemented actions to take in response to types of events that occur;
        determining, by the event monitoring service, that one or more of the multiple events for the executing first defined workflow match the event subscription information from the subscriber user;
        initiating, by the event monitoring service, the one or more computer-implemented actions for the subscriber user in response to the determining, wherein the one or more computer-implemented actions include creating a new instance for the subscriber user of a second defined workflow distinct from the first defined workflow; and
        coordinating performance of further computer-implemented actions by the second defined workflow with performance by the configurable workflow service of at least one workflow component for the client.

2. The method of claim 1 wherein the coordinating of the performance of the further computer-implemented actions by the second defined workflow includes, at a time after the creating of the new instance of the second defined workflow, terminating the created instance of the second defined workflow.

3. The method of claim 1 wherein the first defined workflow includes an indication of a custom event that is defined by the client, wherein the types of event indicated in the event subscription information of the subscriber user include the custom event, and wherein the executing of the first defined workflow includes generating the custom event and providing information to the event monitoring service about the generated custom event.

4. A computer-implemented method comprising:
    receiving, by a configurable workflow service implemented using at least one configured computing system and via one or more first electronic communications sent over one or more computer networks from a first client device of a client, information from the client regarding multiple workflow components of a defined workflow;
    performing, by the configurable workflow service, the defined workflow for the client using hardware resources of the configurable workflow service, including generating an event associated with performance of at least one of the multiple workflow components;
    receiving, by one or more configured computing systems of a separate event monitoring service and via one or more second electronic communications sent over one or more computer networks from a subscriber, event subscription information from the subscriber that describes one or more computer-implemented actions to take in response to occurrence of an event that satisfies one or more specified criteria;

receiving, by the event monitoring service from the configurable workflow service, information about the event generated by the configurable workflow service;

determining, by the event monitoring service, that the received information about the event matches the event subscription information from the subscriber; and initiating, by the event monitoring service and in response to the determining, performance of the one or more computer-implemented actions coordinated with the performance by the configurable workflow service of the at least one workflow component with which the generated event is associated, including at least one of, by the one or more configured computing systems of the event monitoring service, initiating performance of a second defined workflow having multiple automated operations, or modifying performance of one or more automated operations of the second defined workflow.

5. The computer-implemented method of claim 4 wherein the event is one of:
   a workflow component start event generated when the at least one workflow component of the defined workflow starts;
   a workflow component end event generated when the at least one workflow component of the defined workflow ends; or
   a custom event that is defined by the client and is generated during performance of the at least one workflow component of the defined workflow.

6. The computer-implemented method of claim 4 further comprising determining the one or more computer-implemented actions to perform based on the event subscription information.

7. The computer-implemented method of claim 4 further comprising, after the performance of the one or more computer-implemented actions, terminating ongoing performance of the second defined workflow.

8. The computer-implemented method of claim 4 wherein the one or more configured computing systems of the event monitoring service further include the at least one configured computing system of the configurable workflow service, and wherein the subscriber is the client.

9. The computer-implemented method of claim 4 wherein the one or more configured computing systems of the event monitoring service communicate with the at least one computing system that implement the configurable workflow service over one or more intervening computer networks.

10. The computer-implemented method of claim 4 wherein the event is a custom event generated when an indication of the custom event is reached during performance of the at least one workflow component of the defined workflow, wherein the indication includes a custom event logical name, wherein the received information from the configurable workflow service about the event includes the custom event logical name, and wherein the determining that the event matches the event subscription information is based at least in part on the custom event logical name included in the received information.

11. The computer-implemented method of claim 10 wherein the received information from the configurable workflow service about the event does not include any identifying information about the client, and wherein the subscriber is distinct from the client.

12. The computer-implemented method of claim 4 wherein the event subscription information is received from the subscriber before the performing of the defined workflow and is stored for later use, and wherein the stored event subscription information includes information about an event path that has multiple parts representing different types of information.

13. The computer-implemented method of claim 4 wherein the event subscription information is received from the subscriber before the performing of the defined workflow and is stored for later use, and wherein the stored event subscription information includes event filtering criteria that specifies a type of event and at least one type of data included in the event.

14. The computer-implemented method of claim 4 wherein the event subscription information is received from the subscriber before the performing of the defined workflow and is stored for later use, and wherein the stored event subscription information includes a logical identifier of the event generated by the configurable workflow service.

15. The computer-implemented method of claim 4 further comprising:
   storing information regarding publication of events; and
   selectively publishing events to subscribers of the event monitoring service based on the stored information.

16. A non-transitory computer-readable medium having stored contents that cause a computing system of an event monitoring service to:
   determine, by the computing system, that received information about an event matches stored event subscription information of the event monitoring service, wherein the information is received from a configurable workflow service and is associated with starting or ending performance of one of multiple workflow components of a defined workflow executed by the configurable workflow service; and
   initiate, by the computing system and based on the determining that the received information matches the stored event subscription information, performance of one or more selected computer-implemented actions that are based on at least one of the stored event subscription information or the received information and that are coordinated with the starting or the ending of the performance by the configurable workflow service of the one workflow component of the defined workflow, including at least one of initiating performance of a second defined workflow having multiple automated operations, or modifying performance of one or more automated operations of the second defined workflow.

17. The non-transitory computer-readable medium of claim 16 wherein the event is a workflow start event indicating the starting of the performance of the one workflow component, and wherein the performance of the one or more selected computer-implemented actions is initiated to reflect the starting of the performance of the one workflow component.

18. The non-transitory computer-readable medium of claim 16 wherein the stored contents include instructions of the event monitoring service that, when executed, further configure the computing system to:
   receive, by the configured computing system, before execution of the defined workflow by the configurable workflow service begins and via one or more electronic communications sent over one or more computer networks from a client device of a subscriber, the event subscription information from the subscriber, and store the received event subscription information for later use, wherein the event subscription information describes a plurality of computer-implemented actions to take in response to multiple events; and select, after receiving the information about the event from the configurable workflow service, the one or more computer-implemented actions to be performed from the plurality, and wherein the one or more selected computer-implemented actions further include one or more of:

providing a notification of the event to the subscriber;

terminating an existing instance of the second defined workflow;

completing an existing task;

assigning an existing task; or reassigning an existing task.

19. A system, comprising:

one or more processors; and one or more memories having stored instructions of an event monitoring service that, when executed by at least one of the one or more processors, cause the at least one processor to:

receive, by the event monitoring service before execution of a defined workflow by a configurable workflow service begins, and via one or more electronic communications sent over one or more computer networks from a client device of a subscriber, event subscription information from the subscriber that describes computer-implemented actions to take in response to workflow events that occur, and store the received event subscription information for later use;

determine, by the event monitoring service, that received information from the configurable workflow service about occurrence of an event matches the stored event subscription information, wherein the information is associated with starting or ending performance of one of multiple workflow components of the defined workflow during execution of the defined workflow by the configurable workflow service; and initiate, based on the determining that the received information matches the stored event subscription information, coordinated performance of one or more selected computer-implemented actions that are based on the stored event subscription information with the starting or the ending of the performance of the one workflow component of the defined workflow, including at least one of modifying performance of one or more automated operations of a second defined workflow having multiple automated operations, or terminating performance of the second defined workflow.

20. The system of claim 19 wherein the event is a workflow end event indicating the ending of the performance of the one workflow component, and wherein the performance of the one or more selected computer-implemented actions is initiated to reflect the ending of the performance of the one workflow component.

21. The system of claim 19 wherein the stored instructions include software instructions that, when executed, further cause the at least one processor to select the one or more computer-implemented actions to be performed from a plurality of computer-implemented actions specified in the stored event subscription information, and wherein the one or more selected computer-implemented actions further include creating, before the modifying or the terminating, a new instance of the second defined workflow.

* * * * *